(12) United States Patent
Yamamoto et al.

(10) Patent No.: US 11,541,537 B2
(45) Date of Patent: Jan. 3, 2023

(54) ARTICLE POSTURE CHANGING DEVICE AND ARTICLE POSTURE CHANGING METHOD

(71) Applicant: KABUSHIKI KAISHA TOSHIBA, Minato-ku (JP)

(72) Inventors: Daisuke Yamamoto, Kawasaki (JP); Takafumi Sonoura, Yokohama (JP); Junji Oaki, Kawasaki (JP); Hideki Ogawa, Tokyo (JP); Junya Tanaka, Tokyo (JP); Hiroshi Ohtsu, Yokohama (JP); Kohei Nara, Yokohama (JP); Keisuke Kamata, Kawasaki (JP); Rie Katsuki, Kawasaki (JP); Kazuhide Sawa, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 852 days.

(21) Appl. No.: 16/288,329

(22) Filed: Feb. 28, 2019

(65) Prior Publication Data
US 2020/0086484 A1    Mar. 19, 2020

(30) Foreign Application Priority Data
Sep. 18, 2018    (JP) .............................. JP2018-173511

(51) Int. Cl.
*G06F 19/00*     (2018.01)
*B25J 9/16*      (2006.01)
(Continued)

(52) U.S. Cl.
CPC ........... *B25J 9/1664* (2013.01); *B25J 9/1612* (2013.01); *B25J 15/0028* (2013.01);
(Continued)

(58) Field of Classification Search
CPC .... B25J 9/1664; B25J 9/1612; B25J 15/0028; B25J 15/0253; B25J 15/0433; B25J 15/08; B25J 15/0616; G05B 2219/39479
See application file for complete search history.

(56) References Cited

U.S. PATENT DOCUMENTS 8,630,737 B2 *   1/2014  Oda ...................... B25J 9/1697
                                                    700/259
8,854,362 B1 *  10/2014  Poursohi ................. G06T 17/00
                                                    345/420
(Continued)

FOREIGN PATENT DOCUMENTS

JP    2009-255191        11/2009
JP    2011-200948 A      10/2011
(Continued)

*Primary Examiner* — Abby Y Lin
*Assistant Examiner* — Sohana Tanju Khayer
(74) *Attorney, Agent, or Firm* — Oblon, McClelland, Maier & Neustadt, L.L.P.

(57) ABSTRACT

According to an embodiment, an article posture changing device includes: a first end effector configured to grasp a projected tag of an article by adsorption; an arm unit configured to support the first end effector and move the first end effector along at least a vertical direction; and a controller configured to control the arm unit and the first end effector to grasp the tag, lift the article upward, separate the article from a placement surface, change an angle of the article by weight thereof, move the article downward, place the article on the placement surface, and release the grasp of the tag.

15 Claims, 12 Drawing Sheets

(51) Int. Cl.
*B25J 15/08* (2006.01)
*B25J 15/04* (2006.01)
*B25J 15/00* (2006.01)
*B25J 15/02* (2006.01)
*B25J 15/06* (2006.01)

(52) U.S. Cl.
CPC ....... *B25J 15/0253* (2013.01); *B25J 15/0433* (2013.01); *B25J 15/08* (2013.01); *B25J 15/0616* (2013.01); *G05B 2219/39479* (2013.01)

(56) References Cited

U.S. PATENT DOCUMENTS

| | | | |
|---|---|---|---|
| 9,227,323 B1* | 1/2016 | Konolige | H04N 5/33 |
| 10,131,051 B1* | 11/2018 | Goyal | B25J 9/1697 |
| 2005/0065647 A1* | 3/2005 | Perry | B25J 9/161 |
| | | | 700/245 |
| 2006/0200274 A1* | 9/2006 | Watanabe | B25J 15/00 |
| | | | 700/245 |
| 2009/0044655 A1* | 2/2009 | DeLouis | B25J 15/045 |
| | | | 74/490.05 |
| 2011/0238213 A1 | 9/2011 | Nagasaka et al. | |
| 2015/0360368 A1* | 12/2015 | Shin | B25J 13/088 |
| | | | 700/253 |
| 2016/0167228 A1* | 6/2016 | Wellman | B25J 9/1697 |
| | | | 700/218 |
| 2017/0088360 A1* | 3/2017 | Brazeau | G05B 19/41895 |
| 2017/0136632 A1* | 5/2017 | Wagner | B25J 19/04 |
| 2017/0282363 A1 | 10/2017 | Yamada et al. | |
| 2018/0317725 A1* | 11/2018 | Lee | A47L 11/202 |
| 2019/0001508 A1* | 1/2019 | Li | B25J 15/0009 |

FOREIGN PATENT DOCUMENTS

| | | | |
|---|---|---|---|
| JP | 2012-171018 A | | 9/2012 |
| JP | 2012-171019 A | | 9/2012 |
| JP | 2012171019 A | * | 9/2012 |
| JP | 2014-161965 A | | 9/2014 |
| JP | 2016-68164 A | | 5/2016 |
| JP | 2017-177294 A | | 10/2017 |
| JP | 2018-39088 A | | 3/2018 |

* cited by examiner

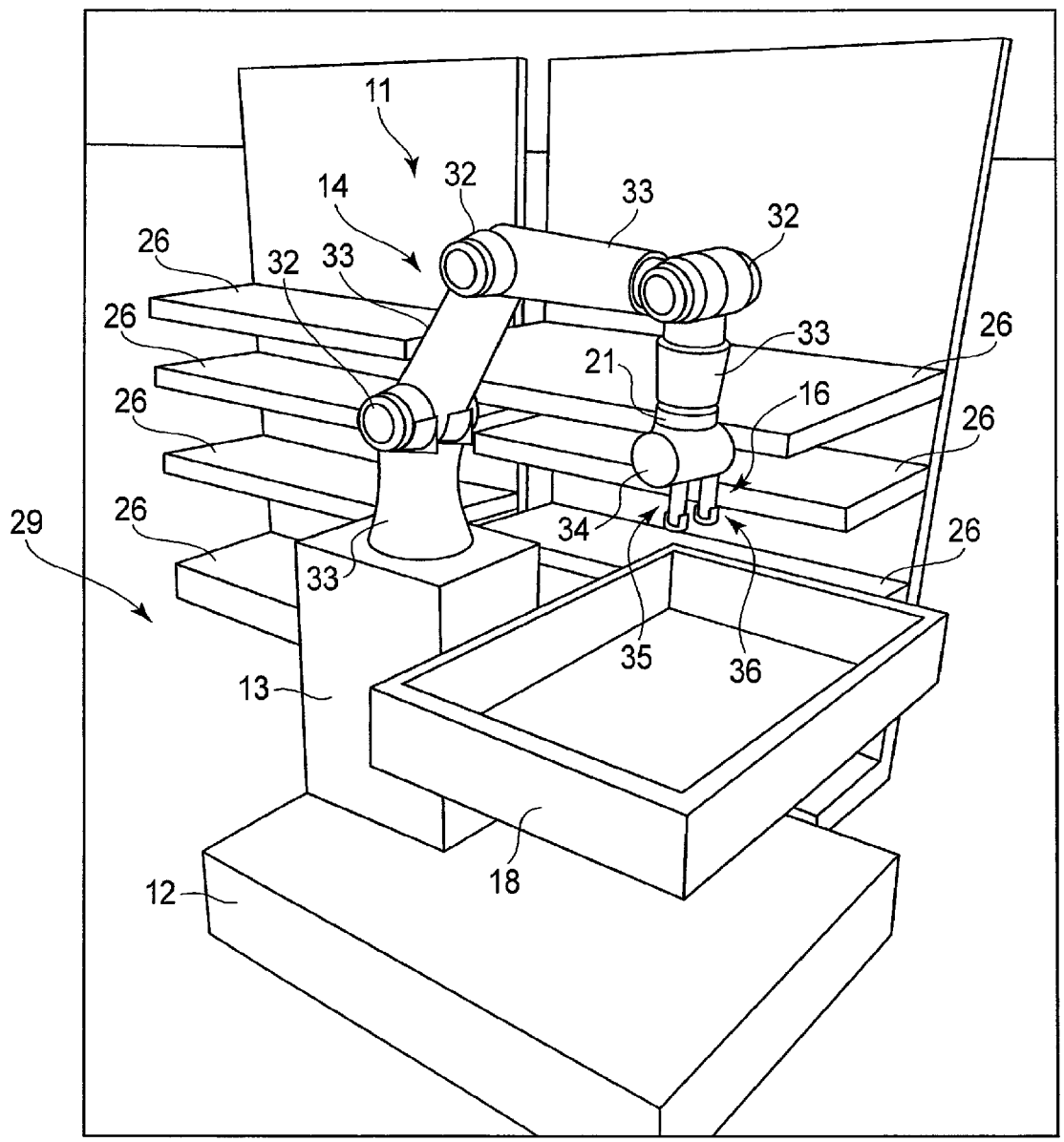
F I G. 1

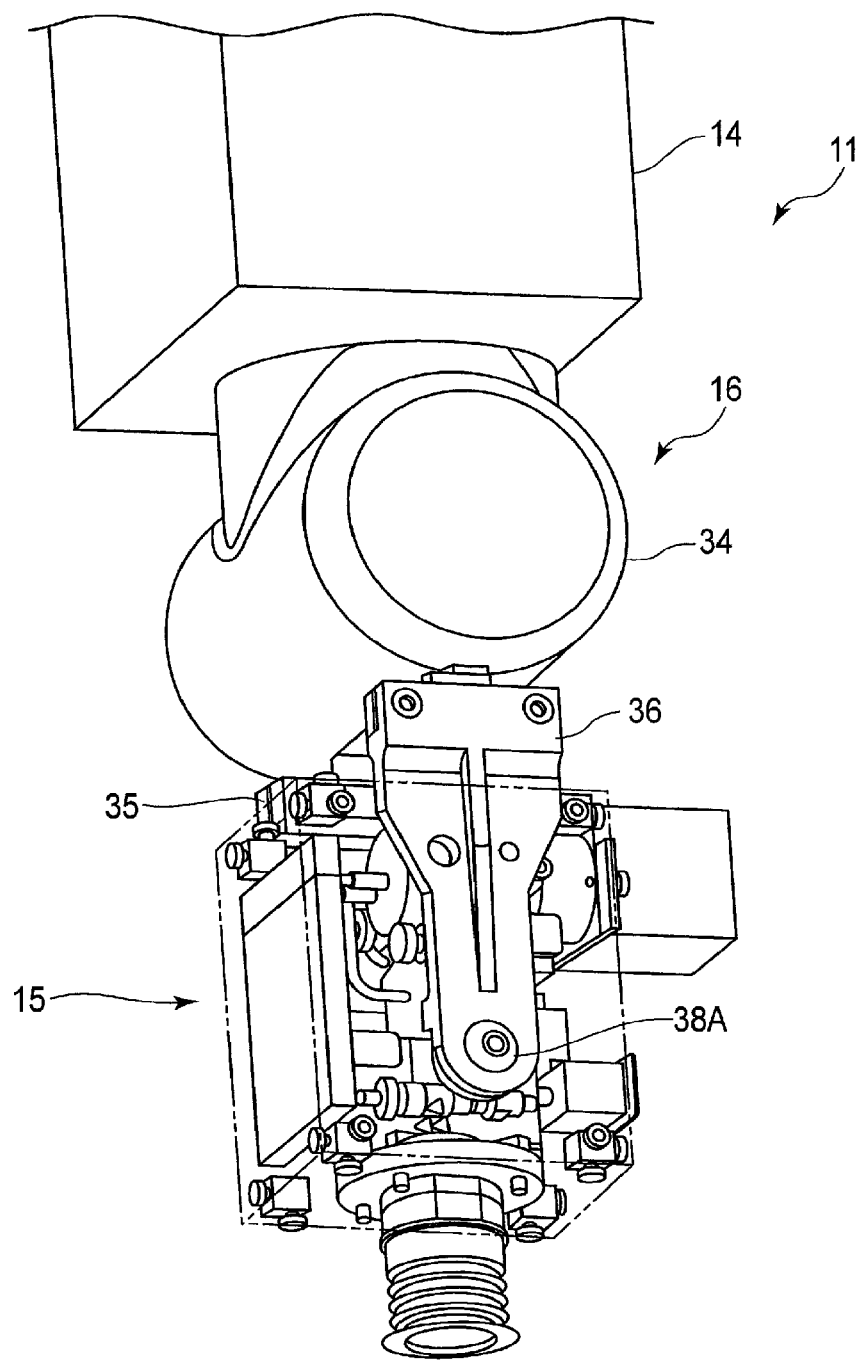
F I G. 3

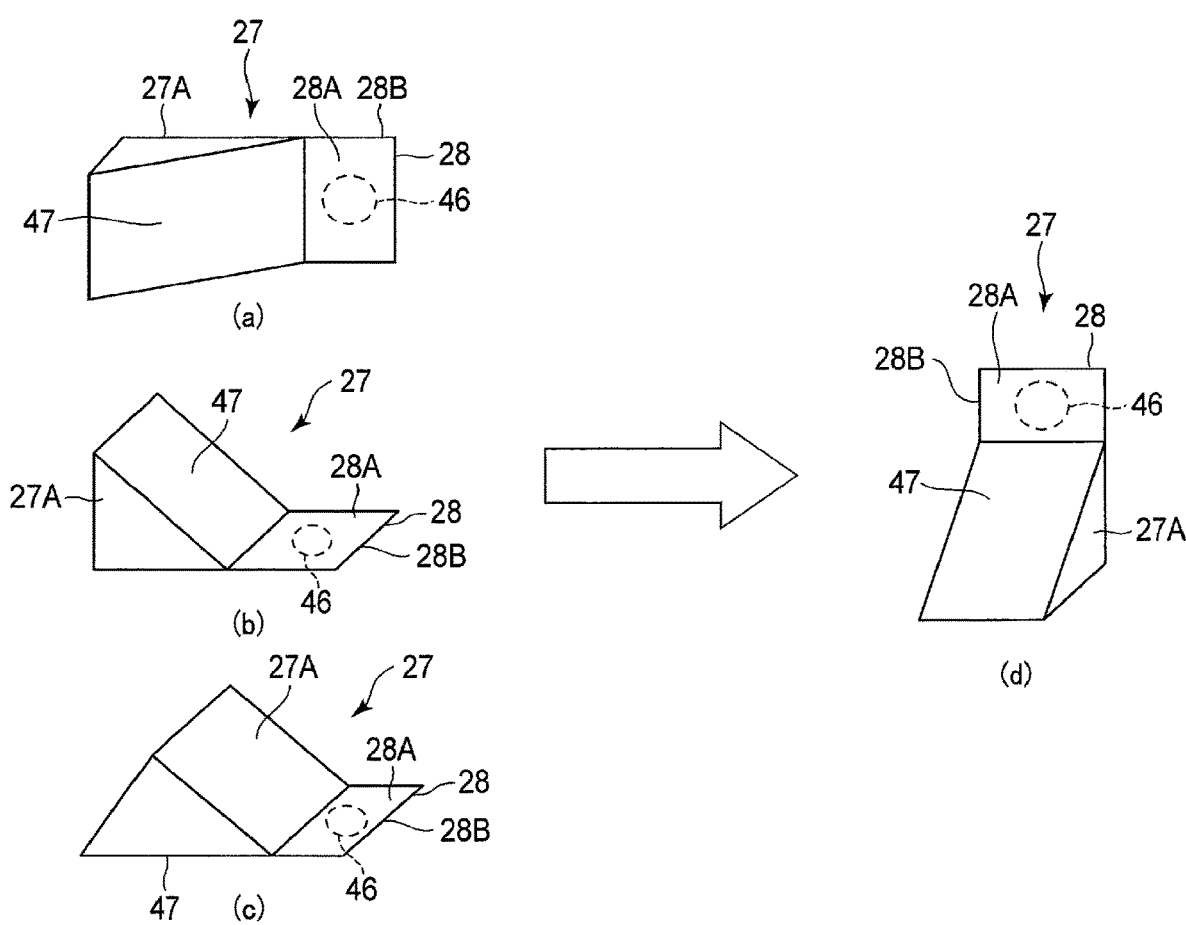
F I G. 7

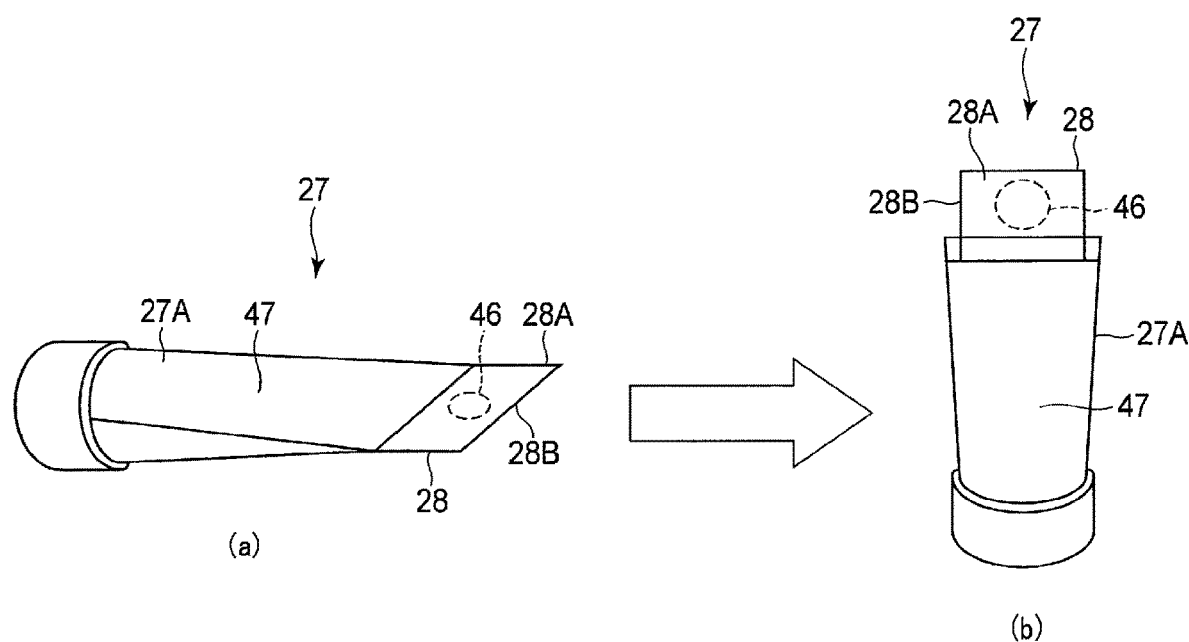
F I G. 9

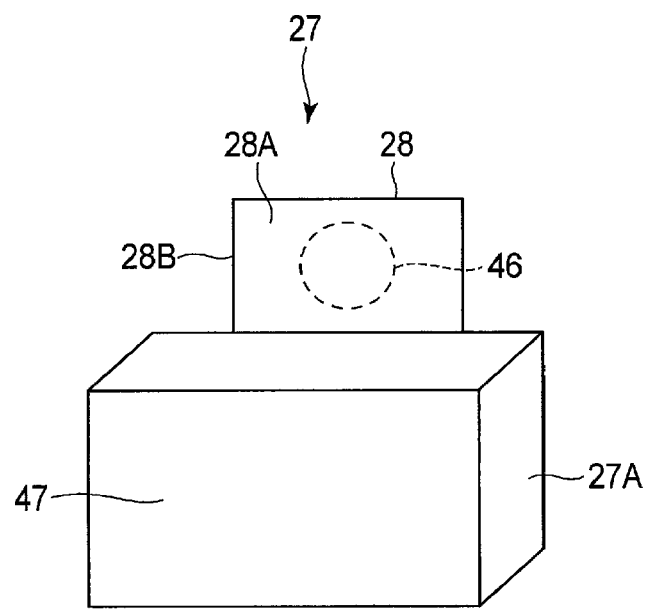
F I G. 13

ARTICLE POSTURE CHANGING DEVICE AND ARTICLE POSTURE CHANGING METHOD

CROSS-REFERENCE TO RELATED APPLICATIONS

This application is based upon and claims the benefit of priority from prior Japanese Patent Application No. 2018-173511, filed Sep. 18, 2018, the entire contents of which are incorporated herein by reference.

FIELD

Embodiments described herein relate generally to an article posture changing device for changing a posture of an article and an article posture changing method for doing the same.

BACKGROUND

Because of labor shortage, labor saving is required in convenience stores and supermarkets. In particular, sales floor management such as merchandise display is said to account for about 20% of store working and thus its automation is desired. In the sales floor management, therefore, it is required to recognize a large variety of articles placed in various postures and rearrange (face up) them in proper posture.

BRIEF DESCRIPTION OF THE DRAWINGS

FIG. 1 is a perspective view showing an article posture changing device according to an embodiment.

FIG. 3 is a perspective view showing a first end effector and a second end effector of the article posture changing device shown in FIG. 1.

FIGS. 7(*a*) to 7(*d*) are perspective views showing an example of an article whose posture is changed by the article posture changing method and the article posture changing device according to the embodiment.

FIGS. 9(*a*) to 9(*b*) are perspective views showing an example of an article whose posture is changed by the article posture changing method and the article posture changing device according to the embodiment.

FIG. 13 is a perspective view showing an example of a wide article according to the modification.

DETAILED DESCRIPTION

According to an embodiment, an article posture changing device includes: a first end effector configured to grasp a projected tag of an article 27 by adsorption; an arm unit configured to support the first end effector and move the first end effector along at least a vertical direction; and a controller configured to control the arm unit and the first end effector to grasp the tag, lift the article upward, separate the article from a placement surface, change an angle of the article by weight thereof, move the article downward, place the article on the placement surface, and release the grasp of the tag.

An embodiment will be described below with reference to the accompanying drawings. The article posture changing device of the embodiment is used in stores and designed to perform an operation (face-up operation) of rearranging articles such as goods of the stores in proper posture. The article posture changing device is able to rearrange articles with various tags such as flexible film-like tags in proper posture by a simple method, irrespective of the posture of the articles. Throughout the drawings, like components are provided with like reference symbols and their overlapping descriptions are omitted.

First Embodiment

A first embodiment will be described with reference to FIGS. 1 to 8. In the following descriptions, a direction in which an aisle extends in the horizontal plane will be defined as an X-axis direction, a direction perpendicular to the X-axis direction in the horizontal plane will be defined as a Y-axis direction, and the vertical direction will be defined as the z-axis direction will be described.

Figure 2:
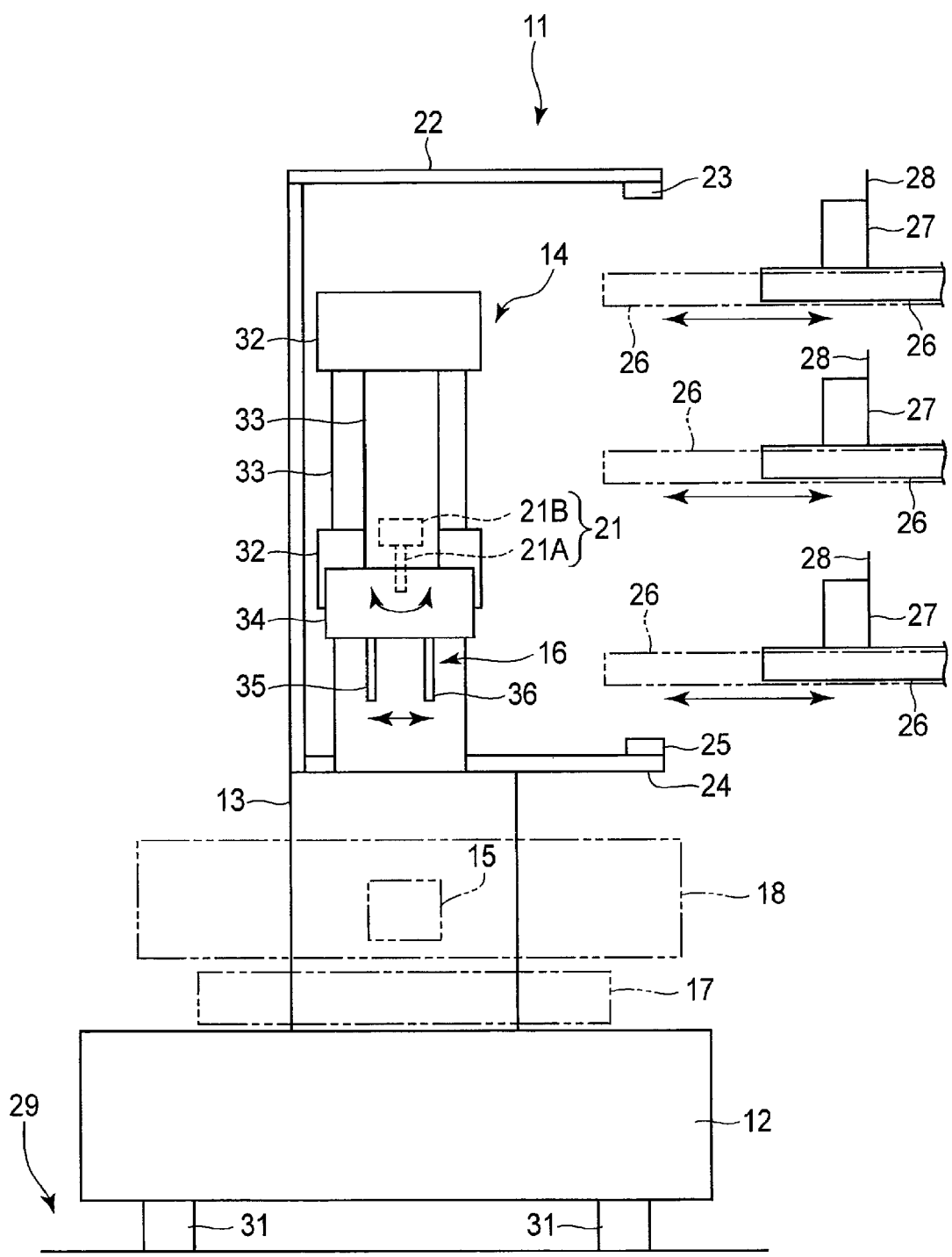
FIG. 2 is a front view showing the article posture changing device shown in FIG. 1.

As shown in FIGS. 1 to 3, the article posture changing device 11 includes a self-propelled dolly 12, a machine base 13 fixed on the dolly 12, an arm unit (manipulator unit) 14 fixed on the machine base 13, a second end effector 16 supported by the arm unit 14, a first end effector 15 grasped by the second end effector 16, a controller 17, a placement unit 18 on which, for example, the first end effector 15 separated from the second end effector 16 is placed, a rotation mechanism 21 provided for the arm unit 14, a first frame 22 attached to the machine base 13, a first recognition unit 23 fixed to the first frame 22, a second frame 24 attached to the machine base 13, and a second recognition unit 25 fixed to the second frame 24. In the article posture changing device 11 of the first embodiment, therefore, the arm 14 unit, second end effector 16 and first end effector 15 are arranged in order from the base of the device toward the top thereof.

The first recognition unit 23 may be configured by a commonly-used digital camera. The first recognition unit 23 is disposed in an upper portion of the article posture changing device 11 so as to overlook and recognize shelves 26 and articles 27 on the shelves 26 in a store as images. The first recognition unit 23 can acquire information about the positions and postures of the articles 27 and those of tags 28 projecting from the articles 27 as images (still or moving images).

The first recognition unit 23 may be configured by a stereo camera capable of measuring a distance. The first recognition unit 23 may recognize distance information to recognize shape information using a sensing camera such as a TOF camera and an RGBD camera. The first recognition unit 23 may also be a sensor capable of acquiring only the distance information called LiDAR or may be configured by combining at least two of these cameras and sensor.

The second recognition unit 25 may be configured by a commonly-used digital camera. The second recognition unit 25 is disposed in a lower portion of the article posture changing device 11. The second recognition unit 25 can acquire information about the positions and postures of the articles 27 on the shelves 26 from below. The second recognition unit 25 may be configured by a stereo camera capable of measuring a distance. The second recognition unit 25 may recognize distance information to recognize shape information using a sensing camera such as a TOF camera and an RGBD camera. The second recognition unit 25 may also be a sensor capable of acquiring only the distance information called LiDAR or may be configured by combining at least two of these cameras and sensor.

In the first embodiment, the shelves 26 (placement surfaces) in the store are preferably configured by a transparent plate such as a glass plate. The shelves 26 on which the articles 27 are placed can also preferably be drawn to the front (to an aisle 29 in which the article posture changing device 11 is located) as shown in FIG. 2.

The dolly 12 includes four wheels 31, a motor for rotating the four wheels 31 and a steering mechanism for rotating two of the wheels 31 to change a direction. The dolly 12 may have a mechanism using four special wheels called Mecanum wheels or Omni wheels to rotate the four wheels independently and thus allow the dolly to move in all directions without any steering mechanism. Also, the dolly 12 may employ a two-wheel independent driving system including rotation-free casters for holding the postures of two wheels and the dolly to rotate the two wheels independently to allow the dolly to move straightly and rotate.

The controller 17 includes, for example, a CPU, a ROM, a RAM, a variety of drivers, a printed circuit board on which these devices are implemented to be electrically connected to each other, and a wireless communication module connected to the printed circuit board. The controller 17 may include a storage device such as a hard disk drive. Note that all or part of the controller 17 may be achieved using hardware such as an application specific integrated circuit (ASIC), a programmable logic device (PLD) and a field programmable gate array (FPGA). The wireless communication module can perform wireless communication with a communication circuit 43A of the first end effector 15.

As the storage device, a tape system such as a magnetic tape and a cassette tape, a disk system including an optical disk such as a CD-ROM, an MO, an MD, a DVD and a CD-R, a card system such as an IC card (including a memory card) and an optical card, or a semiconductor memory system such as a mask ROM, an EPROM, an EEPROM (registered trademark) and a flash ROM may be used.

As shown in FIGS. 1 to 3, the arm unit 14 is a generally-used articulated arm type robot. The arm unit 14 can move in the first and second end effectors 15 and 16 along at least the vertical direction. The arm unit 14 can also move in the horizontal (lateral) direction and other directions. The arm 14 includes a plurality of joints 32 and a rod 33 for connecting the joints 32 to each other. Though the arm unit 14 is configured by an articulated robot (articulated manipulator) in the first embodiment, its configuration is not limited to the articulated robot. The arm 14 may be so configured that a mechanism capable of moving forward and backward in the Z-axis direction (vertical direction) is added to a horizontal articulated (scalar type) robot arm. Alternatively, the arm unit 14 may be configured by a gate-type robot including an X-axis direction slider, a Y-axis direction slider and a Z-axis direction slider. Though the arm unit 14 is configured as a single one in the first embodiment, a second arm unit can be provided. The second arm unit can be used, for example, to draw the shelves 26 in the store toward the aisle 29 and return them to the original position. The second arm unit may be configured substantially in the same manner as the arm unit 14.

The rotation mechanism 21 is provided as part of the arm unit 14 but may be provided independently of the arm unit 14 on the distal end side of the arm unit 14. As shown in FIG. 2, the rotation mechanism 21 can rotate the first and second end effectors 15 and 16 around the axis (e.g. Z axis) defined in the vertical direction. The rotation mechanism 21 includes a rotating shaft 21A and a motor 21B to rotate the first and second end effectors 15 and 16 around the rotating shaft 21A.

Figure 4:
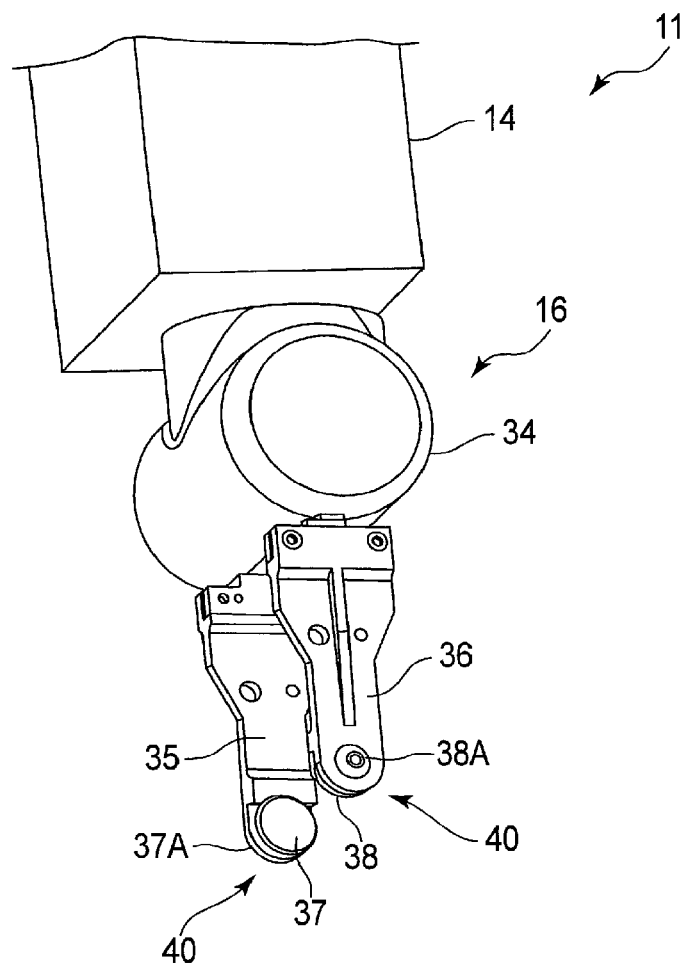
FIG. 4 is a perspective view showing only the second end effector of the article posture changing device shown in FIG. 3.

As shown in FIGS. 3 and 4, the second end effector 16 includes a pair of movable finger-shaped members. The second end effector 16 can hold the tags 28 of the articles 27 such that the tags 28 are each caught between the finger-shaped members (see FIG. 10). That is, the second end effector 16 includes a cylindrical base portion 34, a first finger portion 35 and a second finger portion 36 protruding from the base portion 34, a first pad 37 freely rotatably provided with respect to the first finger portion 35, and a second pad 38 freely rotatably provided with respect to the second finger portion 36. The first and second finger portions 35 and 36 can slide and move in a direction of the central axis of the cylindrical base portion 34 with respect to the base portion 34. The first and second finger portions 35 and 36 can thus move close to and away from each other. The first pad 37 is provided at the distal end of the first finger portion 35 as a portion abutting directly on the articles 27. The second pad 38 is provided at the distal end of the second finger portion 36 as a portion abutting directly on the articles 27. The first pad 37 can rotate on its first shaft portion 37A and can freely rotate with respect to the first finger portion 35. The second pad 38 can rotate on its second shaft portion 38A and can freely rotate with respect to the second finger portion 36. The first and second pads 37 and 38 are formed of an elastic resin material or the like.

The second end effector 16 can thus perform the operation of catching and holding the tags 28 of the articles 27 between the first finger portion 35 (first pad 37) and the second finger portion 36 (second pad 38), i.e. a pinching operation. The first and second pads 37 and 38 compose a free rotation mechanism 40 that can freely be rotated with respect to the first and second finger portions 35 and 36.

The first end effector 15 is configured by a self-contained (independent) type suction device. That is, the first end effector 15 realizes a small-sized suction mechanism that is independent of the dolly 12, machine base 13, arm unit 14, second end effector 16, controller 17, first recognition unit 23 and second recognition unit 25 on the main body side of the article posture changing device 11.

Figure 5:
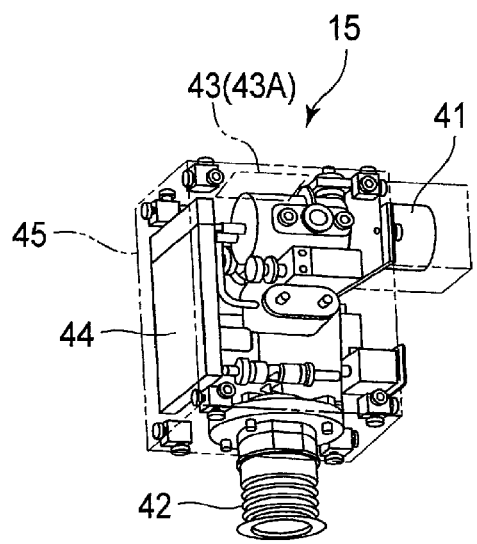
FIG. 5 is a perspective view showing only the first end effector of the article posture changing device shown in FIG. 3.
Figure 6:
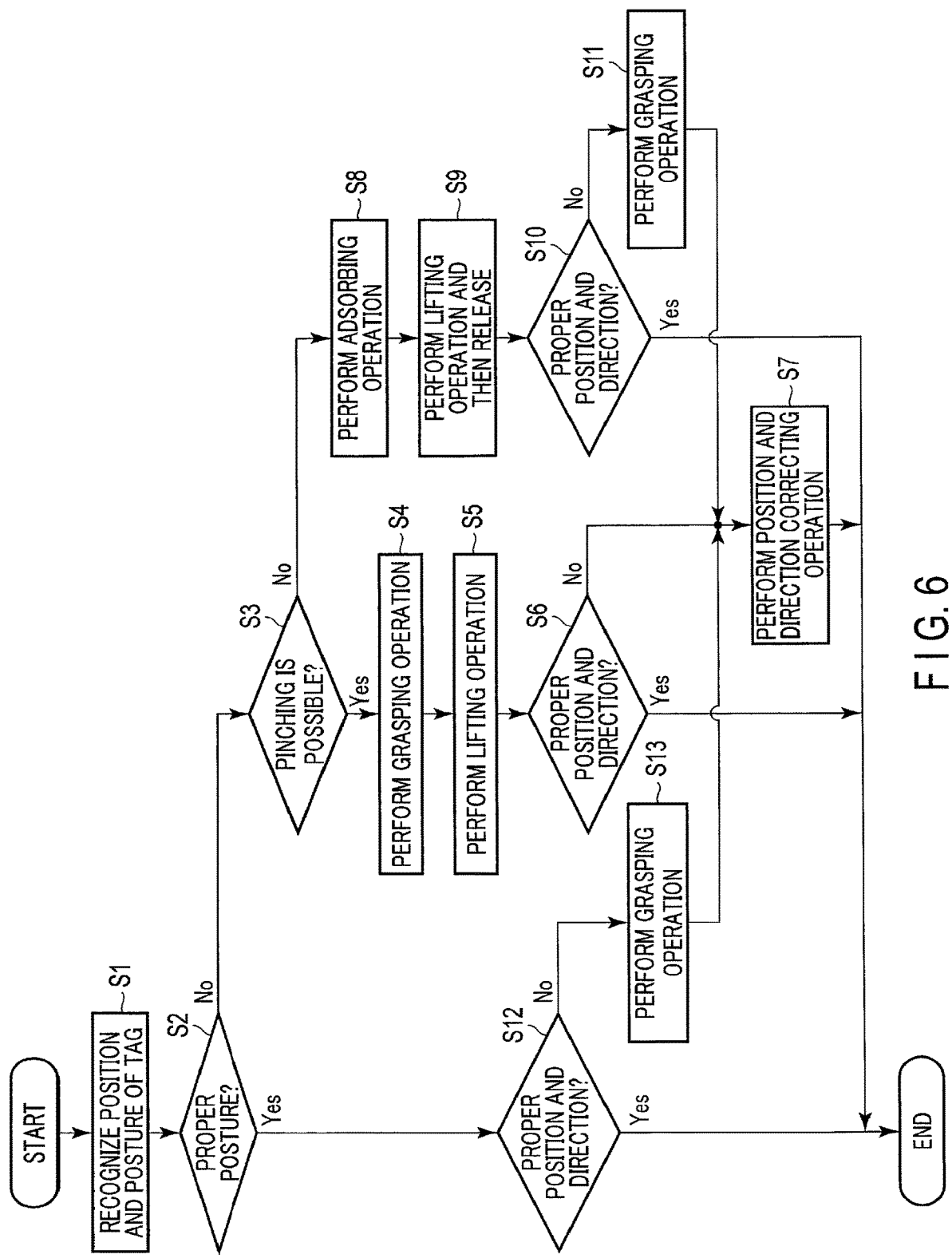
FIG. 6 is a flowchart of an article posture changing method using the article posture changing device according to the embodiment.

As shown in FIG. 5, the first end effector 15 can hold tags 28 of the articles 27 by suction. The first end effector 15 includes a small-sized pump (vacuum pump) 41, a suction tube portion 42 connected to the pump 41, a control circuit 43 including a communication circuit 43A that communicates with the controller 17 on the main body side, a battery 44 that applies power to the pump 41 and the control circuit 43, and a case 45 that stores these components. The distal end of the suction tube portion 42 protrudes outside the case 45. The communication circuit 43A in the control circuit 43 can communicate wirelessly with the controller 17 of the article posture changing device 11 using Bluetooth and the like. When the first end effector 15 is not used (when the second end effector 16 is used), the first end effector 15 is placed on the placement unit 18 in proper posture (see FIG. 2). When the first end effector 15 is used again from this state, the controller 17 drives the arm unit 14 and the second end effector 16 to hold the first end effector 15 between the first and second finger portions of the second end effector 16.

The placement unit 18 is configured by a stand or a box with an optional shape. When pinching is performed by the second end effector 16, the first end effector 15 can be placed on the placement unit 18. The controller 17 may determine articles 27 after expiration date (best-before date) from the ID of a marker 46 on each of the tags 28 in image information obtained by the first and second recognition units 23 and 25. The controller 17 may control the arm unit 14 and the first and second end effectors 15 and 16 to collect the articles 27 after expiration date (best-before date) from the shelves 26 and place them on the placement unit 18.

As shown in FIGS. 7 to 10, the articles (goods) 27 each include a main body 27A and a tag 28 provided to protrude from the main body 27A. The tag 28 includes a marker 46 (image marker) which is held by the first and second end effectors 15 and 16. The marker 46 is preferably provided in or close to the central part of the front 28A of the tag 28. The marker 46 includes a QR code (registered trademark) (two-dimensional barcode) and an image marker such as an AR marker. The marker 46 can be used to know the position and posture of the tag 28, using image characteristics, and may further be capable of recognizing the ID of the tag 28. The marker 46 can be shaped like a circle, a rectangle and any other. If the tag 28 also serves for publicity for the goods, the controller 17 may learn the image characteristics of the publicity in advance to recognize the position, posture, ID, etc. of the goods using the image characteristics. The marker 46 may be printed with special ink such that it is invisible to human eyes. The marker 46 may be formed of an RFID tag or the like and used to estimate the position and posture of the goods 27 alone using the position information of the RFID tag or in combination with image information obtained by the first and second recognition units 23 and 25 when necessary.

The marker 46 preferably includes a portion grasped between the first and second end effectors 15 and 16. Further, the shape of an article including the tag 28 is registered in advance in the storage device of the controller 17 or a server connected (communicated) wirelessly to the controller 17 to recognize the position and posture of the tag 28 from the shape. Also the position and posture of the tag 28 can be recognized using a learning technology called deep learning, AI and the like.

Figure 8:
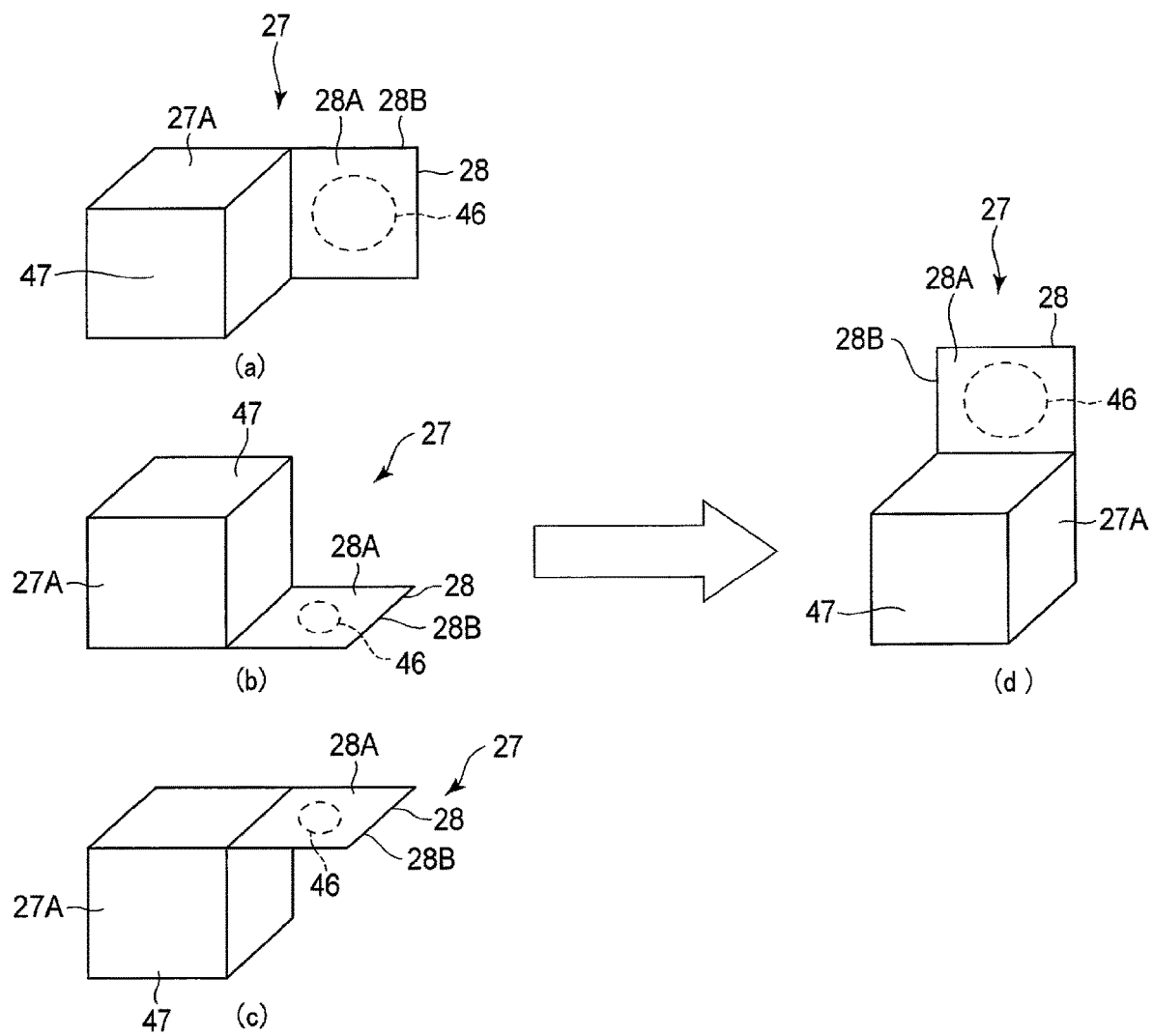
FIGS. 8(*a*) to 8(*d*) are perspective views showing an example of an article whose posture is changed by the article posture changing method and the article posture changing device according to the embodiment.
Figure 10:
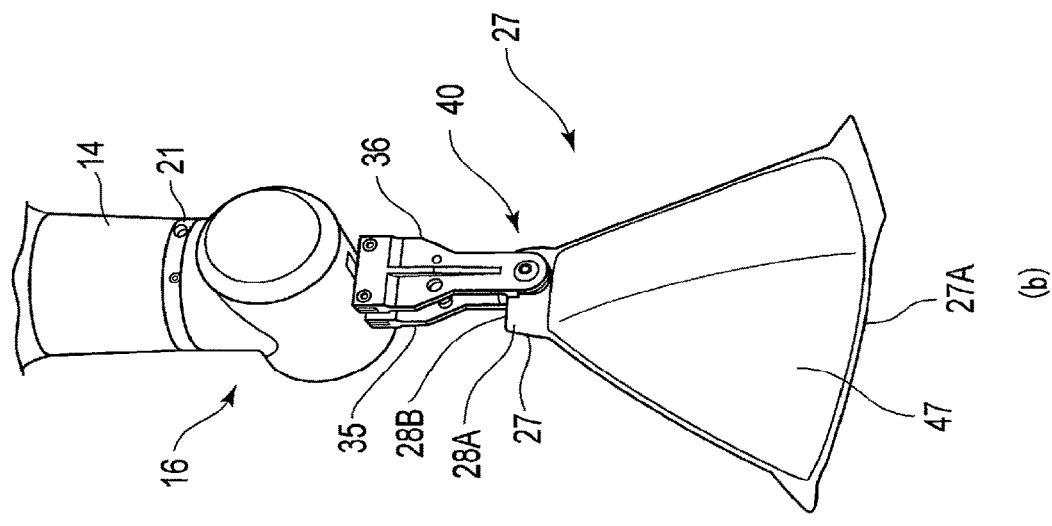
FIGS. 10(*a*) to 10(*b*) are perspective views showing an example of an article whose posture is changed by the article posture changing method and the article posture changing device according to the embodiment.
Figure 10:
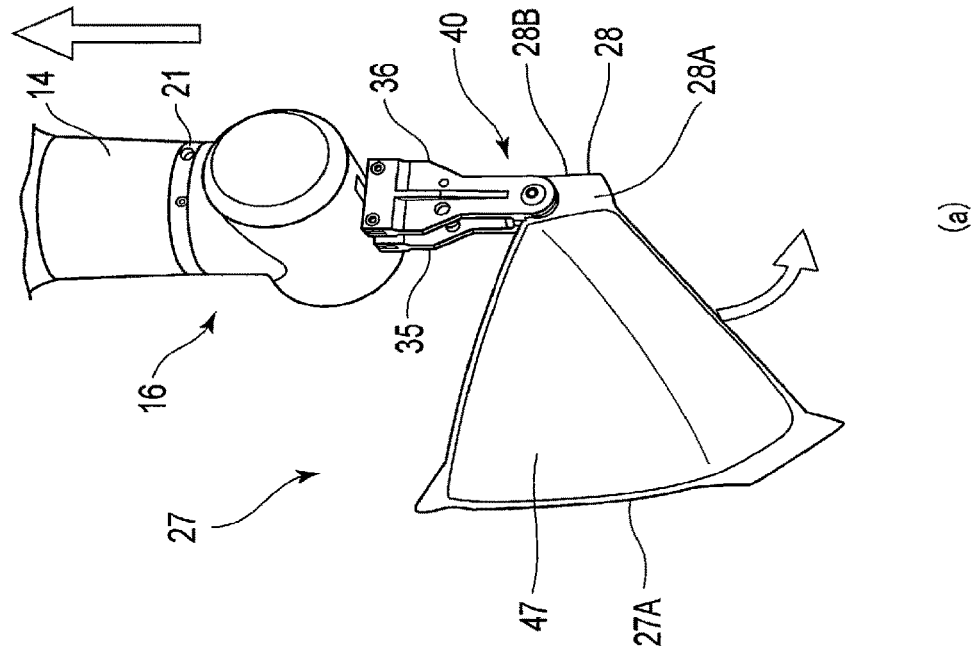

An article posture changing method using the article posture changing device of the first embodiment will be described with reference to FIGS. 6 to 11. A variety of articles having their unique shape are directed to the article posture changing method. For example, the article 27 shown in FIG. 7 is a sandwich and its packaging film, the article 27 shown in FIG. 8 is a box for storing accessories, household goods, electronic devices, light bulbs, parts and other items, the article 27 shown in FIG. 9 is a tube for storing toothpaste and facial soap, and the article 27 shown in FIG. 10 is a rice ball and its packaging film.

First, a tag position and posture recognition process is performed (step S1). The first recognition unit 23 that is fixed in a position to overlook the article 27 on the shelve 26 (placement surface) recognizes the position and posture of the article 27 and the position and posture of the tag 28. Alternatively, the second recognition unit 25 disposed below recognizes the position and posture of the article 27 and those of the tag 28. The tag position and posture recognition process (step S1) and its subsequent processes may naturally be performed after the shelve 26 is drawn from the original position by the second arm unit (not shown).

If there are a plurality of articles 27, the controller 17 discriminates them by the IDs of markers 46 on the tags 28 thereof and extracts a target article 27 to be faced up. The controller 17 determines whether the target article 27 is in a proper posture (step S2). The proper posture varies from article to article. As one example of the proper posture, the article 27 stands with its bottom surface down and its tag 28 in the vertical direction (see FIGS. 7(d), 8(d), 9(b) and 10(b)). The proper posture for each article 27 may be stored in the storage device of the controller 17 or the server connected to the controller 17 via a communication network such as a wireless LAN, and read out when necessary.

When the article 27 is not in a proper posture, the controller 17 detects the posture of the tag 28 by image recognition and another method to determine whether the article 27 can be pinched (step S3). The state in which the article 27 can be pinched is, for example, the posture of the article 27 that is put into a sideways position and that of the tag 28 extending in the vertical direction (see FIGS. 7(a), 8(a) and 10(a)). That is, the controller 17 determines from information about the posture of the tag 28 whether the tag 28 extends in the vertical direction or the direction intersecting the vertical direction.

The controller 17 may use the marker (image marker) 46 on the tag 28 for the above determination. In this case, the controller 17 controls the second end effector 16 to pinch the tag 28 between the first finger portion 35 (first pad 37) and the second finger portion 36 (second pad 38) of the second end effector 16. At this time, the second end effector 16 can gain access to the tag 28 from above because there is space between the article 27 and a further upper shelf 26. As shown in FIG. 10(a), the controller 17 drives the arm unit 14 to locate the second end effector 16 above the article 27 and then controls the arm unit 14 and the second end effector 16 to perform a grasping (pinching) operation (step S4). Then, the controller 17 performs an operation to lift the article 27 (step S5). In this lift operation, the controller 17 controls the arm unit 14 to move the second end effector 16 upward to lift the article 27 (see FIG. 10(a) in particular). Weight is concentrated on the article 27, excluding the tag 28. Therefore, when the article 27 is lifted upward, rotational force exerted downward by the weight of the article 27 itself acts on part of the article 27 held between the first and second pads 37 and 38 of the second end effector 16 (see FIG. 10(a)). Since the first and second pads 37 and 38 compose the free rotation mechanism 40 that freely rotates with respect to the first and second finger portions 35 and 36, the article 27 smoothly rotates downward and is gradually brought into proper posture. When the article 27 is separated from the shelf 26 (placement surface) and put into proper posture, the article 27 is placed on the shelf 26 again, and the pinching and lift operation is completed (see FIG. 10(b)). Similarly, the article 27 in the state shown in FIG. 7(a) is also brought into the state shown in FIG. 7(d) by a similar operation, and the article 27 in the state shown in FIG. 8(a) is also brought into the state shown in FIG. 8(d) by a similar operation.

Then, the controller 17 determines whether the article 27 is placed in a proper position and in a proper direction (azimuth angle) (step S6). The proper position means that the article 27 is placed in a position close to the aisle 29 on the shelf 26 (placement surface) or if the article 27 has already been placed in a position close to the aisle 29 on the shelf 26, another article 27 is placed immediately after that article 27. The proper direction (azimuth angle) means that the front 47 of the article 27 is opposed to the aisle 29 (i.e., the front 47 of the article 27 is parallel to the edge of the shelf 26). In other words, the proper direction (azimuth angle) means that the normal of the front of the article 27 is parallel to the Y axis.

When the article 27 is placed in the proper position and in the proper direction (azimuth angle), the process is completed as it is. When it is not in the proper position or in the proper direction (azimuth angle), the position and direction are corrected by pinching (step S7). At this time, the controller 17 causes the second end effector 16 to grasp the tag 28 of the article 27 and controls the arm unit 14 to lift the article 27 and move it to the proper position. The controller 17 drives the rotation mechanism 21 to rotate the second end effector 16, which grasps the article 27, around the Z axis (defined by the vertical direction) and rotate the article 27 in the proper direction (azimuth angle). The process is thus completed. As the lift operation by the pinching of the first embodiment and the movement and rotation operation by the pinching thereof, the article has only to move in the horizontal direction and the second end effector has only to rotate around the Z axis. Further, the surface (pinching surface) pinched between the first and second pads 37 and 38 is parallel to the front 47 of the article 27 (only in the example of FIG. 10, however, the pinching surface is orthogonal to the front of the article 27). These factors make it possible to perform the face-up operation with accuracy. Note that the operation in step S7 can naturally be performed with the article 27 lifted by the second end effector 16, without placing the article 27 on the shelf 26 (placement surface) in the operation in step S5. This can shorten the time required for the face-up operation further.

When the tag 28 extends in the lateral direction (horizontal direction, namely, the direction intersecting the vertical direction) in step S3, the controller 17 determines that the article cannot be pinched (see FIGS. 7(b), 7(c), 8(b), 8(c) and 9(a)). In this case, the controller 17 controls the arm unit 14 and the second end effector 16 to pick up the first end effector 15 from the placement unit 18. At this time, the first end effector 15 is pinched and held between the first and second finger portions 35 and 36 of the second end effector 16. Then, the controller 17 activates the first end effector 15 by wireless communication. Thus, in the first end effector 15, the control circuit 43 drives the pump 41 to generate a suction force (negative pressure) from the suction tube portion 42. The controller 17 drives the arm unit 14 to bring the distal end of the suction tube portion 42 of the first end effector 15 into contact with the tag 28 and adsorb the tag 28 to the distal end of the suction tube portion 42 (step S8).

Using the marker 46 (image marker) on the tag 28, the position of the tag 28 is detected more easily and more accurately. There is space between the tag 28 and a further upper shelf 26, and the first end effector 15 is accessible from above. Note that since the tag 28 is disposed in the lateral direction (horizontal direction), it is easily adsorbed by the first end effector 15. The controller 17 may discriminate between the front 28A and back 28B of the tag 28 by the marker 46 (image marker) on the tag 28.

Figure 11:
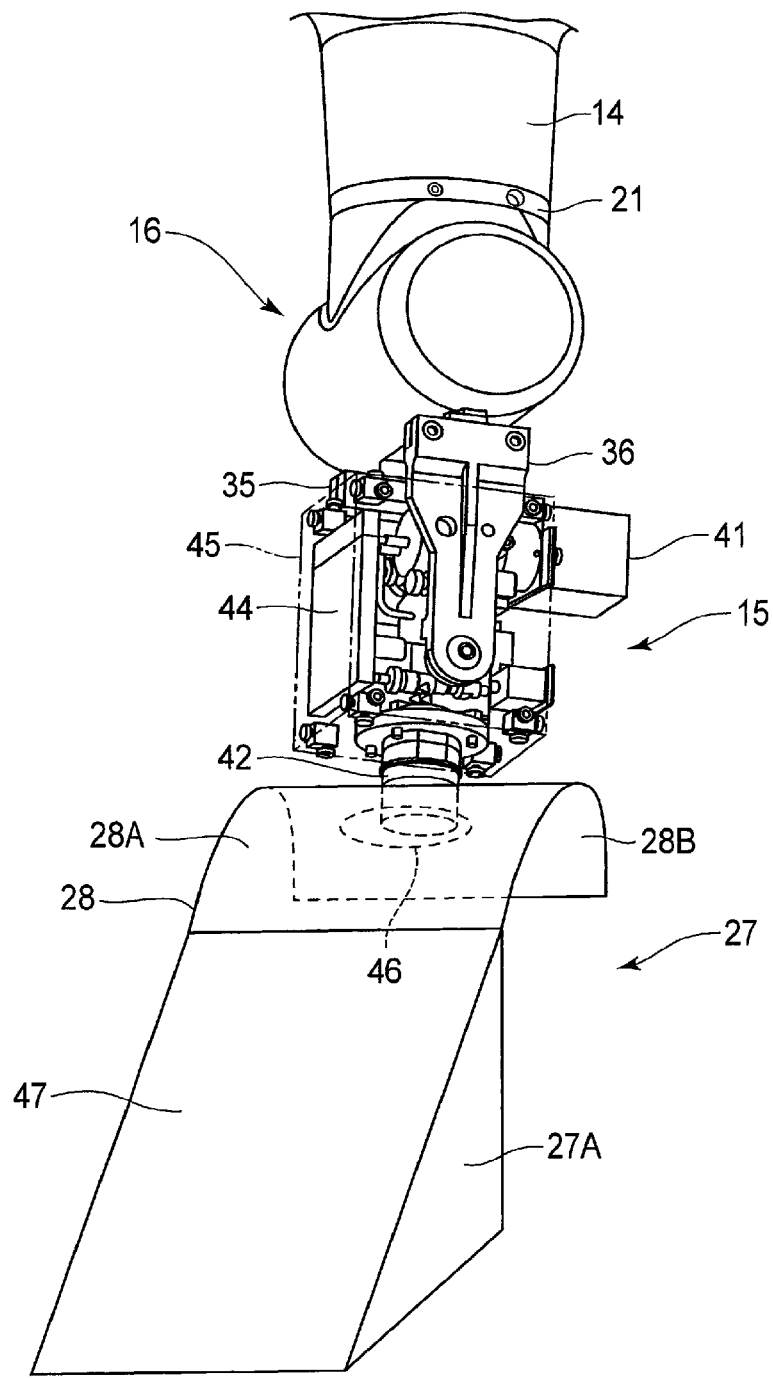
FIG. 11 is a perspective view of the first end effector that adsorbs an article.

Then, the first end effector 15 performs a lift operation (step S9). At that time, as shown in FIG. 11, the controller 17 drives the arm unit 14 to move the first end effector 15 upward and lift the article 27. The main body of the article 27 is heavier than the tag 28. The tag 28 is often formed of a flexible material such as a resin film. During the lift operation of the article 27, therefore, the rotational force generated from the weight of the article 27 itself acts downward around the tag 28. When, e.g. the article 27 in the state shown in FIG. 7(a) is lifted, the tag 28 is bent downward and brought into the state shown in FIG. 11, with the result that the article 27 is placed in proper posture. When the article 27 is separated from the shelf 26 and brought into the proper posture, the controller 17 operates the arm unit 14 to lower the article 27 again and place the article 27 on the shelf 26 (placement surface). When the article 27 is placed on the shelf 26, the controller 17 stops the adsorption caused by the first end effector 15 via wireless communication. Accordingly, the lift operation is completed.

Subsequently, the controller 17 determines whether the article 27 is placed in the proper position and in the proper direction (azimuth angle) (step S10). When it is placed in the proper position and in the proper direction (azimuth angle), the process is completed as it is. When it is not in the proper position or in the proper direction (azimuth angle), the position and direction are corrected by pinching (step S7). At this time, the controller 17 places the first end effector 15 on the placement unit 18 and causes the second end effector 16 to grasp (pinch) the article (step S11). The controller 17 drives the arm unit 14 to lift the article and move it to the proper position (step S7). The controller 17 also drives the rotation mechanism 21 to rotate the second end effector 16, which grasps the article 27, around the Z axis and rotate the article 27 in the proper direction (azimuth angle). The process is thus completed (step S7).

When the article 27 is already located in the proper posture in step S2, the controller 17 determines in step S12 whether the article 27 is placed in the proper position and in the proper direction (azimuth angle). When the controller 17 determines that the article 27 is placed in the proper position and in the proper direction (azimuth angle), the process is completed as it is. When the controller 17 determines that the article 27 is not placed in the proper position or in the proper direction (azimuth angle), it pinches the article 27 in the same manner as described above (step S13) to correct the position and direction of the article 27 (step S7). At this time, the controller 17 causes the second end effector 16 to grasp the article 27 and drives the arm unit 14 to lift the article 26 and move it to the proper position. The controller 17 also drives the rotation mechanism 21 to rotate the second end effector 16, which grasps the article 27, around the Z axis (defined by the vertical direction) and rotate the article 27 in the proper direction (azimuth angle). The process is thus completed (step S7). Note that an error occurs when the article 27 can be grasped by neither of the first and second end effectors 15 and 16. In this case, the alarm may be given to people around the device by an appropriate method to notify them of the error.

Figure 12:
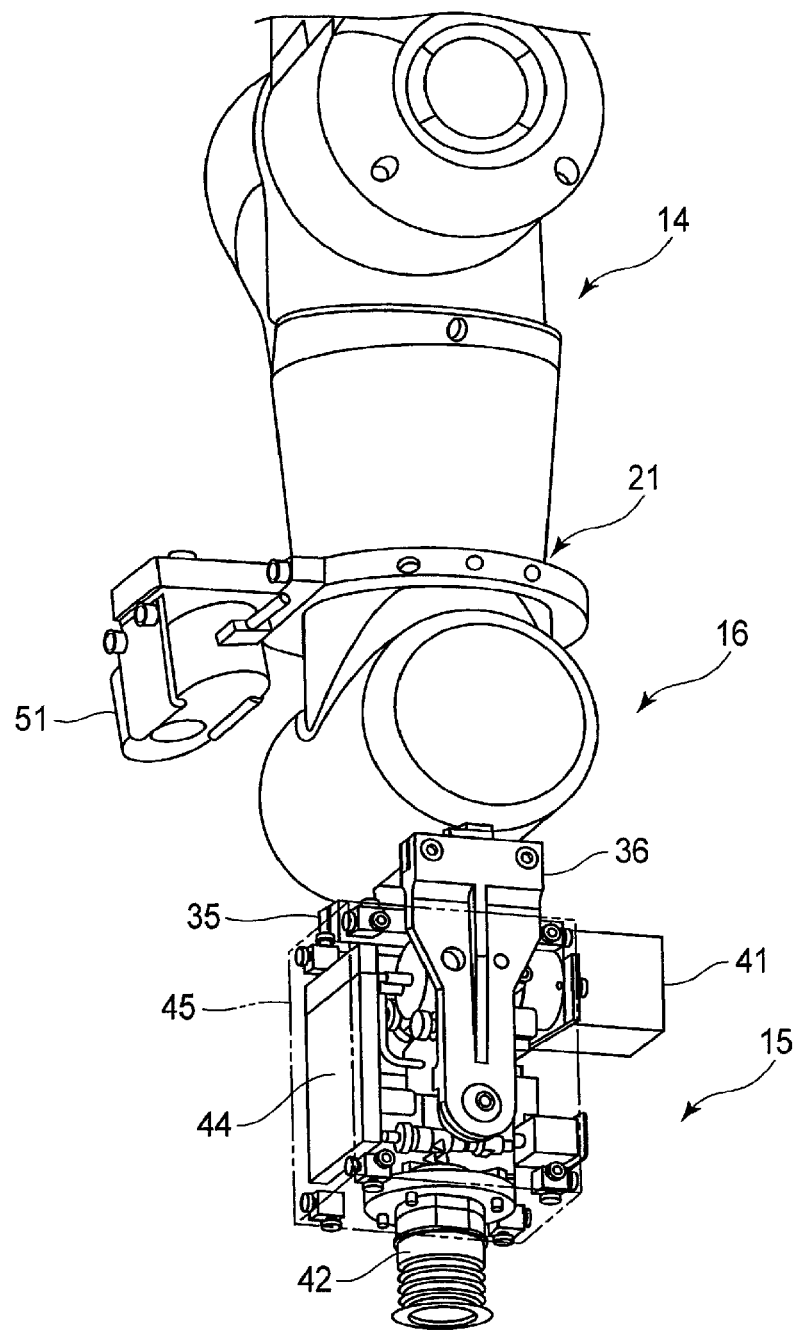
FIG. 12 is a perspective view showing a modification to the embodiment, in which a third discrimination unit is provided close to the first end effector and the second end effector.

In the first embodiment described above, the first recognition unit 23 is placed above the article posture changing device 11 and the second recognition unit 25 is placed below the device 11. The placement of the recognition units is not limited to this. As in a modification to the first embodiment shown in FIG. 12, a third recognition unit 51 may be provided halfway through the arm unit 14. Accordingly, the recognition unit can be provided close to the article 27, and the position and posture of the article 27 and those of the tag 28 can be recognized with higher accuracy. The third recognition unit 51 may be configured in the same manner as the first recognition unit 23 that is configured by a digital camera or the like.

Furthermore, as in a modification to the first embodiment shown in FIG. 13, the article 27 may be wider than the tag 28. Also, as in the example shown in FIG. 10, a part or a packaging film of the article 27 or a projected portion of the packaging film, which is not strictly called a tag, may be used. In the first embodiment, both the first and second end effectors 15 and 16 are provided. Of course, the article posture changing device 11 may include only one of the end effectors 15 and 16. When the article posture changing device 11 includes only the first end effector 15, it is preferable to fix the first end effector 15 to the arm unit 14.

The above-described first embodiment brings about the following.

The article posture changing device 11 includes a first end effector 15 configured to grasp a projected tag 28 of an article 27 by adsorption, an arm unit 14 configured to support the first end effector 15 and move the first end effector 15 along at least a vertical direction, and a controller 17 configured to control the arm unit 14 and the first end effector 15 to grasp the tag 28, lift the article 27 upward, separate the article 27 from a placement surface, change the angle of the article 27 by weight thereof, move the article 27 downward, place the article 27 on the placement surface, and release the grasp of the tag 28.

In the article posture changing method, a first end effector 15 configured to grasp a tag 28 of an article 27 by adsorption and an arm unit 14 configured to support the first end effector 15 and move the first end effector 15 along at least a vertical direction grasp the tag 28 to lift the article 27 upward, separate the article 27 from a placement surface, change the angle of the article 27 by weight thereof, move the article 27 downward, place the article on the placement surface, and release the grasp of the tag 28.

According to the configurations of the above device and method, since the posture of the article 27 can be changed by adsorption, the tag of the article 27 can be adsorbed and grasped even though the article 27 is placed in a posture in which the tag 28 is difficult to grasp (pinch). Since, furthermore, the article 27 is rotated by its own weight, the entire configuration of the article posture changing device 11 can be simplified. Even though the adsorption surface of the article 27 is inclined, a complicated operation of bringing a suction pad into contact with the inclined adsorption surface need not be performed. Accordingly, a complicated operation planning program is not required, the manufacturing cost of the article posture changing device 11 can be reduced, and the operation can be performed simply and in short time. Thus, an face-up operation that takes a long time can be automated and the store management can be improved in efficiency.

The article posture changing device 11 includes a rotation mechanism 21 provided for the arm unit 14 and configured to rotate the first end effector 15 around an axis defined by the vertical direction. With this configuration, even though the direction (azimuth angle) of the article 27 is shifted from a proper one, the article 27 can automatically be located in the proper direction (azimuth angle). Store management can thus be improved in efficiency.

The article posture changing device 11 includes a second end effector 16 configured to grasp a projected tag 28 of an article 27 by pinching, an arm unit 14 configured to support the second end effector 16 and move the second end effector 16 along at least a vertical direction, and a controller 17 configured to control the arm unit 14 and the second end effector 16 to grasp the tag 28, lift the article 27 upward, separate the article 27 from a placement surface, change the angle of the article 27 by weight thereof, move the article 27 downward, place the article 27 on the placement surface, and release the grasp of the tag 28.

In the article posture changing method, a second end effector 16 configured to grasp a tag 28 of an article 27 by pinching and an arm unit 14 configured to support the second end effector 16 and move the second end effector 16 along at least a vertical direction grasp the tag 28 to lift the article 27 upward, separate the article 27 from a placement surface, change the angle of the article 27 by weight thereof, move the article 27 downward, place the article 27 on the placement surface, and release the grasp of the tag 28.

According to the configurations of the above device and method, articles 27 located in such a posture that their tags 28 can be pinched by the second end effector 16 can be arranged in proper posture efficiently in shorter time. Since, furthermore, the article 27 is rotated by its own weight, the entire configuration of the article posture changing device 11 can be simplified.

The second end effector 16 includes a first finger portion 35, a second finger portion 36 opposed to the first finger portion 35 and configured to move close to and away from the first finger portion 35, a first pad 37 freely rotatably provided for the first finger portion 35 and abutting one surface of the tag 28, and a second pad 38 freely rotatably provided for the second finger portion 36 and abutting the other surface of the tag 28.

The foregoing configuration makes it possible to achieve a simple structure in which the tag 28 is pinched from its both sides and grasped. Since the first finger portion 35, second finger portion 36, first pad 37 and second pad 38 compose a free-rotation mechanism, an angle change operation of lifting the article 27 and changing its angle by its own weight can be performed smoothly.

The article posture changing device 11 includes a first end effector 15 configured to grasp a projected tag 28 of an article 27 by adsorption, a second end effector 16 configured to grasp the tag 28 by pinching, an arm unit 14 configured to support the first end effector 15 and the second end effector 16 and move the first end effector 15 and the second end effector 16 along at least a vertical direction, and a controller 17 configured to control the arm unit 14 and at least one of the first end effector 15 and the second end effector 16 to grasp the tag 28, lift the article 27 upward, separate the article 27 from a placement surface, change the angle of the article 27 by weight thereof, move the article 27 downward, place the article 27 on the placement surface, and release the grasp of the tag 28.

In the article posture changing method, one of a first end effector 15 configured to grasp a tag 28 of an article 27 by adsorption and a second end effector 16 configured to grasp the tag 28 by pinching and an arm unit 14 configured to support the first end effector 15 and the second end effector 16 and move the first end effector 15 and the second end effector 16 along at least a vertical direction grasp the tag 28 to lift the article 27 upward, separate the article 27 from a placement surface, change the angle of the article 27 by weight thereof, move the article 27 downward, place the article 27 on the placement surface, and release the grasp of the tag 28.

According to the configurations of the above device and method, when the tag 28 of the article 27 can be grasped by pinching, the article 27 can be located in proper posture, and when the tag 28 can be adsorbed, the article 23 can also be located in proper position. Thus, in accordance with the posture of the article 27, an appropriate grasping technique can be selected, and the number of times an error is caused when the tag 28 cannot be grasped is reduced to achieve store management user-friendly and efficiently.

The second end effector 16 is configured to pinch and grasp the first end effector 15. With this configuration, the first end effector 15 can be configured detachably as appropriate and can serve as a structure to support the second end effector 16. Thus, the type of an end effector can be changed in accordance with the posture of the article 27 and a member dedicated to support and fix the second end effector 16 an be excluded, with the result that the article posture changing device 11 in which the number of components is reduced can be achieved.

The article posture changing device 11 includes a placement unit on which the first end effector 15 is placed. The placement unit is convenient when the first end effector 15 is separated and only the second end effector 16 is used to perform an operation, and makes it possible to shorten operation time. The placement unit is also convenient when the first end effector 15 is picked up to perform an operation by the first end effector 15 when necessary.

The article posture changing device 11 includes a recognition unit configured to acquire information about the posture of the tag 28. The controller 17 determines from information about a posture of the tag 28 whether the tag 28 extends along the vertical direction or the direction intersecting the vertical direction. When the controller 17 determines that the tag 28 extends in the vertical direction, it controls the arm unit 14 and the second end effector 16 to grasp the tag 28, lift the article 27 upward, separate the article 27 from the placement surface, change the angle of the article 27 by weight thereof, move the article 27 downward, place the article 27 on the placement surface, and release the grasp of the tag 28. When the controller 17 determines that the tag 28 extends in the direction intersecting the vertical direction, it controls the arm unit 14 and the first end effector 15 to grasp the tag 28, lift the article 27 upward, separate the article 27 from the placement surface, change the angle of the article 27 by weight thereof, move the article 27 downward, place the article 27 on the placement surface, and release the grasp of the tag 28.

With the above configuration, the controller 17 can automatically select an appropriate grasping technique in accordance with the posture of the article 27, and the number of times an error is caused can be reduced to achieve store management user-friendly and efficiently.

One surface of the tag 28 is provided with a marker 46 that is recognizable by the recognition unit. The marker 46 makes it possible to determine a posture of the tag 28 and a type of the article with higher efficiency.

The article posture changing device 11 includes a second recognition unit 25 provided below the placement surface and configured to acquire position information of the article 27. With this configuration, when the placement unit is transparent, the position of the article can be grasped more accurately. Efficient store management can thus be achieved.

In the article posture changing method, a recognition unit acquires information about a posture of the article 27 placed on the placement surface, the controller 17 determines from the information about a posture of the article 27 whether the article 27 is placed at a predetermined azimuth angle. When the controller 17 determines that the article 27 is not placed at the predetermined azimuth angle, the second end effector 16, the arm unit 14 and the rotation mechanism 21 configured to rotate the second end effector 16 around an axis defined by the vertical direction grasp the tag 28 to lift the article 27 upward, separate the article 27 from the placement surface, change the azimuth angle of the article 27 to the predetermined azimuth angle, move the article 27 downward, place the article 27 on the placement surface, and release the grasp of the tag 28.

According to the foregoing method, the direction (azimuth angle) of the article 27 can automatically be adjusted by a machine. Thus, operation time required for store management can be shortened and the store management can be improved in efficiency.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. The inventions of the embodiments and their modifications can appropriately be, of course, combined into one invention.

The invention claimed is:

1. An article posture changing device comprising:
    a first end effector configured to grasp a projected tag of an article by adsorption;
    a second end effector configured to grasp the projected tag of the article by pinching;
    an arm unit configured to support the first end effector and move the first end effector along at least a vertical direction; and
    a controller configured to determine whether the projected tag of the article can be grasped by pinching,
    when the controller determines the projected tag of the article cannot be grasped by pinching, the controller is configured to control the arm unit and the first end effector to grasp the tag, lift the article upward, separate the article from a placement surface, change an angle of the article by rotational force generated from weight of the article itself move the article downward, place the article on the placement surface, and release the grasp of the tag, the rotational force acting downward around the projected tag.

2. The device of claim 1, further comprising a rotation mechanism provided for the arm unit and configured to rotate the first end effector around an axis defined by the vertical direction.

3. The device of claim 1, wherein
    the arm unit is configured to support the second end effector and move the second end effector along at least a vertical direction; and
    the controller is configured to control the arm unit and the second end effector to grasp the tag, lift the article upward, separate the article from a placement surface, change an angle of the article by weight thereof, move the article downward, place the article on the placement surface, and release the grasp of the tag.

4. The device of claim 3, wherein the second end effector includes:
a first finger portion;
a second finger portion opposed to the first finger portion and configured to move close to and away from the first finger portion;
a first pad freely rotatably provided for the first finger portion and abutting one surface of the tag; and
a second pad freely rotatably provided for the second finger portion and abutting other surface of the tag.

5. The device of claim 3, further comprising a rotation mechanism provided for the arm unit and configured to rotate the second end effector around an axis defined by the vertical direction.

6. The device of claim 3, wherein the second end effector is configured to pinch and grasp the first end effector.

7. The device of claim 6, further comprising a placement unit on which the first end effector is placed.

8. The device of claim 3, further comprising at least one of a camera or a sensor configured to acquire information about a posture of the tag,
wherein:
the controller determines from the information about a posture of the tag whether the tag extends along the vertical direction or a direction intersecting the vertical direction;
when the controller determines that the tag extends in the vertical direction, the controller controls the arm unit and the second end effector to grasp the tag, lift the article upward, separate the article from the placement surface, change an angle of the article by weight thereof, move the article downward, place the article on the placement surface, and release the grasp of the tag; and
when the controller determines that the tag extends in a direction intersecting the vertical direction, the controller controls the arm unit and the first end effector to grasp the tag, lift the article upward, separate the article from the placement surface, change an angle of the article by weight thereof, move the article downward, place the article on the placement surface, and release the grasp of the tag.

9. The device of claim 8, wherein one surface of the tag is provided with a marker that is recognizable by the at least one of the camera or the sensor.

10. The device of claim 4, further comprising a rotation mechanism provided for the arm unit and configured to rotate the second end effector around an axis defined by the vertical direction.

11. The device of claim 1, further comprising at least one of a second camera or a second sensor provided below the placement surface and configured to acquire position information of the article.

12. An article posture changing method, wherein a first end effector is configured to grasp a tag of an article by adsorption, a second end effector is configured to grasp the tag of the article by pinching, and an arm unit is configured to support the first end effector and move the first end effector along at least a vertical direction, the method comprising:
determining, by a controller, whether the tag of the article can be grasped by pinching; and
when the determining determines the tag of the article cannot be grasped by pinching, controlling, by the controller, the arm unit and the first end effector to grasp the tag, lift the article upward, separate the article from a placement surface, change an angle of the article by rotational force generated from weight of the article itself, move the article downward, place the article on the placement surface, and release the grasp of the tag, the rotational force acting downward around the projected tag.

13. The method of claim 12, wherein the arm unit is configured to support the second end effector and move the second end effector along at least a vertical direction, the method further comprising
controlling the arm unit and the second end effector to grasp the tag, lift the article upward, separate the article from a placement surface, change an angle of the article by weight thereof, move the article downward, place the article on the placement surface, and release the grasp of the tag.

14. The method of claim 13, further comprising:
causing at least one of a camera or a sensor to acquire information about a posture of the tag;
causing the controller to determine from the information about a posture of the tag whether the tag extends along the vertical direction or a direction intersecting the vertical direction;
causing the controller to control the second end effector and the arm unit to grasp the tag, lift the article upward, separate the article from the placement surface, change an angle of the article by weight thereof, move the article downward, place the article on the placement surface, and release the grasp of the tag, when the controller determines that the tag extends in the vertical direction; and
causing the controller to control the first end effector and the arm unit to grasp the tag, lift the article upward, separate the article from the placement surface, change an angle of the article by weight thereof, move the article downward, place the article on the placement surface, and release the grasp of the tag, when the controller determines that the tag extends in a direction intersecting the vertical direction.

15. The method of claim 14, further comprising:
causing the at least one of the camera or the sensor to acquire information about a posture of the article placed on the placement surface;
causing the controller to determine from the information about a posture of the article whether the article is placed at a predetermined azimuth angle;
when the controller determines that the article is not placed at the predetermined azimuth angle, causing the second end effector, the arm unit and a rotation mechanism to grasp the tag, lift the article upward, separate the article from the placement surface, change an azimuth angle of the article to the predetermined azimuth angle, move the article downward, place the article on the placement surface, and release the grasp of the tag, the rotation mechanism being configured to rotate the second end effector around an axis defined by the vertical direction.

* * * * *